(12) United States Patent
Wen et al.

(10) Patent No.: US 9,100,386 B2
(45) Date of Patent: Aug. 4, 2015

(54) METHOD AND SYSTEM OF PLUG-IN PRIVILEGE CONTROL

(71) Applicant: Alibaba Group Holding Limited, George Town (KY)

(72) Inventors: Bo Wen, Hangzhou (CN); Liming Zhang, Hangzhou (CN)

(73) Assignee: Alibaba Group Holding Limited (KY)

( * ) Notice: Subject to any disclaimer, the term of this patent is extended or adjusted under 35 U.S.C. 154(b) by 409 days.

(21) Appl. No.: 13/717,270

(22) Filed: Dec. 17, 2012

(65) Prior Publication Data

US 2013/0111565 A1  May 2, 2013

Related U.S. Application Data

(63) Continuation of application No. 12/804,437, filed on Jul. 20, 2010, now Pat. No. 8,370,906.

(51) Int. Cl.
*G06F 21/00* (2013.01)
*H04L 29/06* (2006.01)
*G06F 21/51* (2013.01)

(52) U.S. Cl.
CPC ........... *H04L 63/08* (2013.01); *G06F 21/51* (2013.01)

(58) Field of Classification Search
CPC .......... G06F 21/50; G06F 21/51; H04L 63/08
USPC ............................................................ 726/4
See application file for complete search history.

(56) References Cited

U.S. PATENT DOCUMENTS

| 7,254,814 | B1 * | 8/2007 | Cormier et al. ............... 717/120 |
| 7,509,636 | B2 | 3/2009 | McGuire et al. |
| 2004/0015958 | A1 | 1/2004 | Veil et al. |
| 2004/0064696 | A1 | 4/2004 | Daigle et al. |
| 2008/0155405 | A1 | 6/2008 | Lock et al. |

FOREIGN PATENT DOCUMENTS

| CN | 1928842 | 3/2007 |
| CN | 101202753 | 6/2008 |
| JP | 2001142711 | 5/2001 |
| JP | 2004145604 | 5/2004 |
| JP | 2006085291 | 3/2006 |

OTHER PUBLICATIONS

Ter Louw et al. "Enhancing web browser security against nnalware extensions." Journal in Computer Virology 4.3 (2008): 179-195.
(Continued)

*Primary Examiner* — Jeffrey Pwu
*Assistant Examiner* — Thong Truong
(74) *Attorney, Agent, or Firm* — Van Pelt, Yi & James LLP

(57) ABSTRACT

A plug-in privilege control includes authorizing a plug-in, including assigning a plug-in identification number (PIN) to the plug-in wherein the PIN is used to identify an identification (ID) of the corresponding plug-in; notifying the plug-in about the PIN; storing information about the plug-in and a plug-in accessible service to a mapping of services; receiving a request for a service from the plug-in, wherein the request includes the PIN; retrieving the ID of the plug-in according to the PIN; and determining whether to allow the plug-in to access the service that it requested.

17 Claims, 8 Drawing Sheets

(56) References Cited

OTHER PUBLICATIONS

Grier et al. "Secure web browsing with the OP web browser." Security and Privacy, 2008. SP 2008. IEEE Symposium on. IEEE, 2008.

Grier et al. "How I learned to stop worrying and love plugins." In Web 2.0 Security and Privacy. 2009.

* cited by examiner

METHOD AND SYSTEM OF PLUG-IN PRIVILEGE CONTROL

CROSS REFERENCE TO OTHER APPLICATIONS

This application is a continuation of co-pending U.S. patent application Ser. No. 12/804,437, entitled METHOD AND SYSTEM OF PLUG-IN PRIVILEGE CONTROL filed Jul. 20, 2010 which is incorporated herein by reference for all purposes, which claims priority to People's Republic of China Patent Application No. 200910159658.6 entitled PLUG-IN PRIVILEGE CONTROL METHOD AND SYSTEM filed Jul. 22, 2009 which is incorporated herein by reference for all purposes.

FIELD OF THE INVENTION

The present invention relates to the field of software and, in particular, to a plug-in privilege control method and system.

BACKGROUND OF THE INVENTION

A plug-in is a special kind of software component that adds specific capacities to a larger software application. A plug-in typically cannot be executed alone, but instead relies on the larger software application, which is often referred to as the "host application program." If the plug-in is supported by the software application, it enables customizing the functionality of an application. Plug-ins have been widely used due to their compactness, effectiveness, and power to perform a function that the software applications themselves do not perform. For example, plug-ins are commonly used in web browsers to process specific types of files. The browser can directly invoke the plug-ins to play video, scan for viruses, and display new file types. Some plug-ins include a Dynamic-Link Library (DLL).

To perform functions that a hosting program cannot perform, a plug-in is often required to access a service available from the hosting program. FIG. 1 is a schematic diagram illustrating how a plug-in operates. As shown in the figure, the host application provides services which the plug-in can use, including a mechanism for plug-ins to register themselves with the host application program and a protocol for the exchange of data with plug-ins. Plug-ins depend on the services provided by the host application programs and do not usually work by themselves. On the contrary, the host application operates independently of the plug-ins, making it possible for end-users to add and update plug-ins dynamically without needing to make changes to the host application. Open Application Programming Interfaces (APIs) provide a standard interface allowing third parties to create plug-ins that interact with the host application. Host application programs often provide Software Development Kits (SDKs) that are accessible to plug-in developers.

Since plug-ins may be developed by plug-in developers who may or may not be trusted by the host application programs, security measures have to be taken by the hosting application programs.

One of the conventional security measures is to close all the sensitive interfaces. For example, if a host application program is an instant messaging application program, it will not open the interfaces that access contact information, account information, transaction entries, lists of commodities, etc. Therefore, this approach to plug-in privilege control substantially limits the host application programs' openness, as well as the quantity and functionalities of plug-ins that can be developed for the corresponding program.

Another conventional security measure uses a matching scheme of service levels and plug-in levels to control plug-in privilege. For example, both the services and plug-ins of the hosting application are assigned with respective levels arranged in descending orders, and correspondence relationships between the service levels and the plug-in levels are established to determine which level(s) of services are accessible to the respective levels of plug-ins. Then, when a specific service is requested for a plug-in, the service level of the service is determined as well as whether the service level is appropriate for the plug-in requested. Access to the service by the plug-in is allowed or disabled according to the result of the matching. This plug-in privilege control approach not only performs the intended security management and control for plug-ins, but also offers different services to different plug-in developers while taking security into consideration.

However, both of the conventional plug-in privilege control approaches may have some drawbacks.

The precision control of the conventional approaches may not meet the requirement of some host applications and unwanted security compromises may have to be made. Conventionally, the existing service levels are divided into two levels, "high" and "low," and the plug-ins are also divided into two levels, "normal" and "trusted." Services with both the "high" and "low" levels are accessible to plug-ins with the "trusted" level. Only the "low" level of services may be accessible to plug-ins with the "normal" level. As a result, respective services at the same service level are either accessible or inaccessible to a plug-in at a specific level. Thus, it is difficult to attain the granularity of precision control on the privilege of plug-ins. Because of the simple two-level schemes of services and plug-ins, the conventional approaches may lead to unwanted security leakage. Since the accessibility of plug-ins is only in two states, accessible or inaccessible, at one of the two service levels, in order to allow a plug-in to function at one service level, all of the services at this particular level are open to the plug-in. If a reviewing engineer who assigns the plug-in levels does not consider thoroughly all the possibilities of security leaks, a plug-in may be able to access some services that it should not be allowed to access. Thus, the security of the host application programs may be compromised.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer-readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time, or a specific component that is manufactured to perform the task. As used herein, the term "processor" refers to one or more devices, circuits, and/or processing cores configured to process data, such as computer program instructions.

A detailed description of one or more embodiments of the invention is provided below, along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
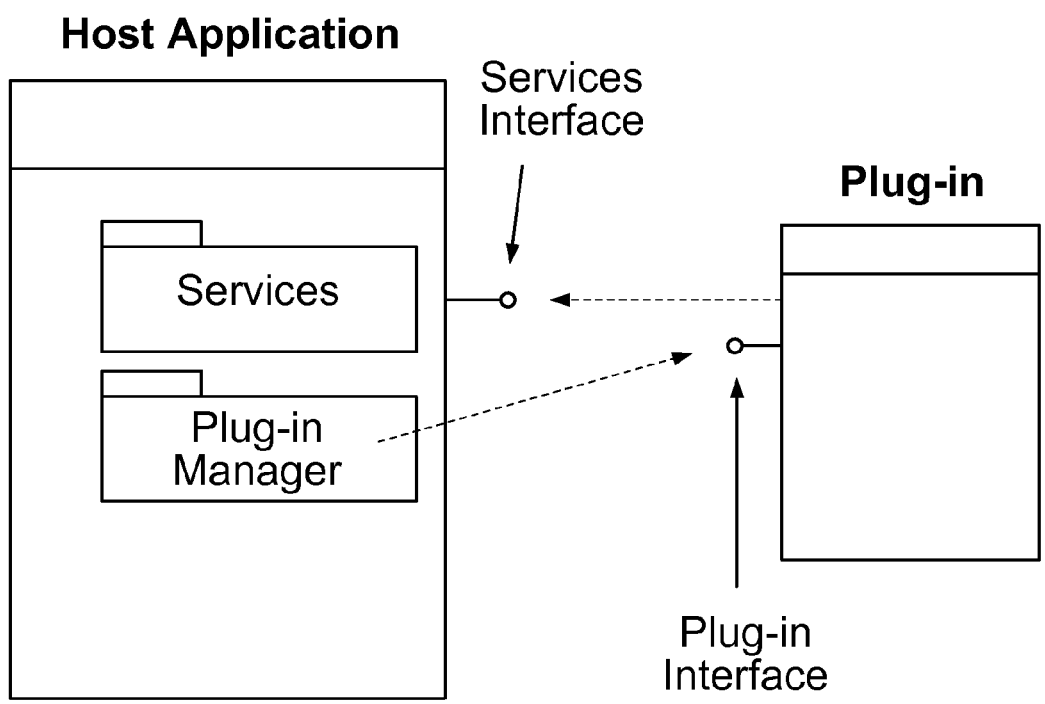
FIG. 1 is a schematic diagram illustrating how a plug-in operates.
Figure 2:
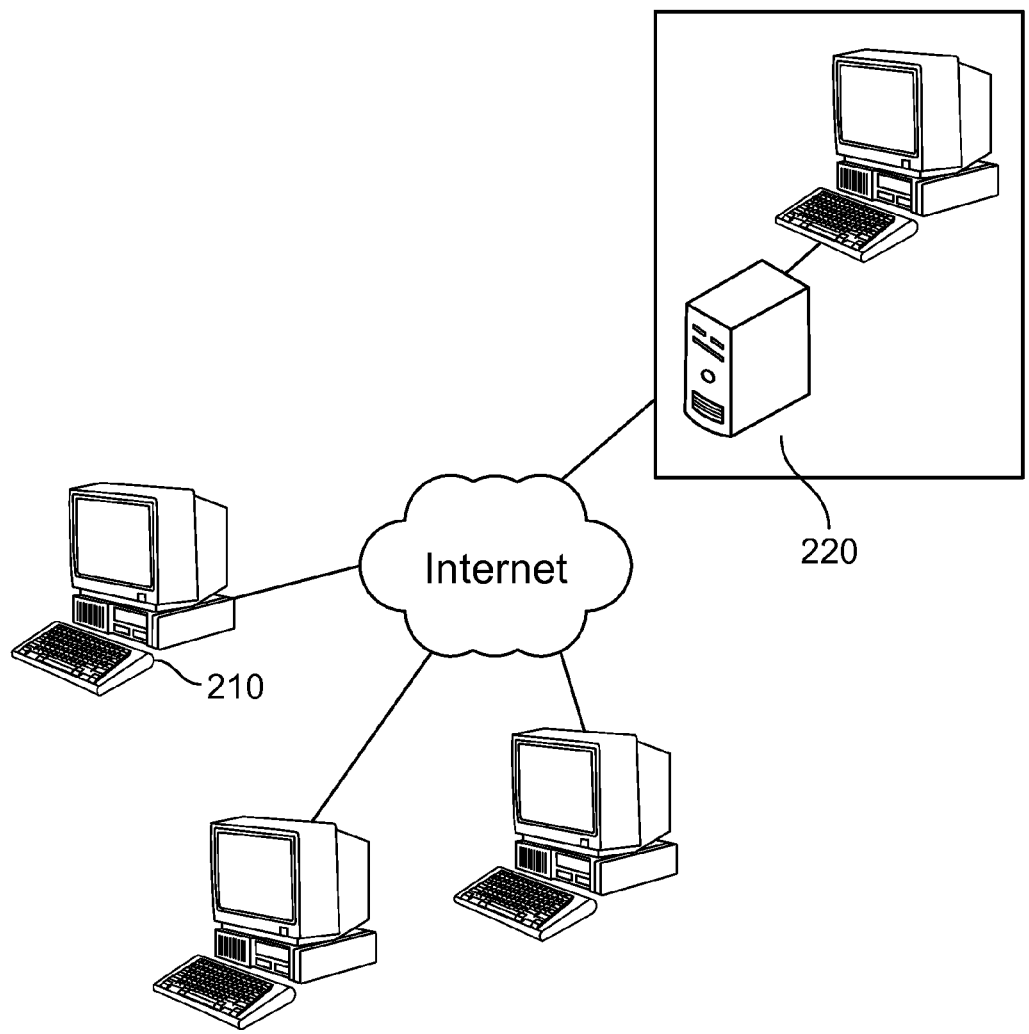
FIG. 2 is a schematic diagram illustrating an embodiment of a system for plug-in privilege control on a host application program.

Plug-in privilege control is described. FIG. 2 is a schematic diagram illustrating an embodiment of a system for plug-in privilege control on a host application program. In this example, the system is adapted to control the service access privilege of plug-ins on the host application program. The system includes a client 210 and a plug-in server 220. In some embodiments, the host application program resides on client 210 and plug-in server 220 controls the privilege of plug-ins and provides APIs and web service to a plug-in software developer. In some embodiments, the API is invoked through an interface function in response to an HTTP request.

Figure 3:
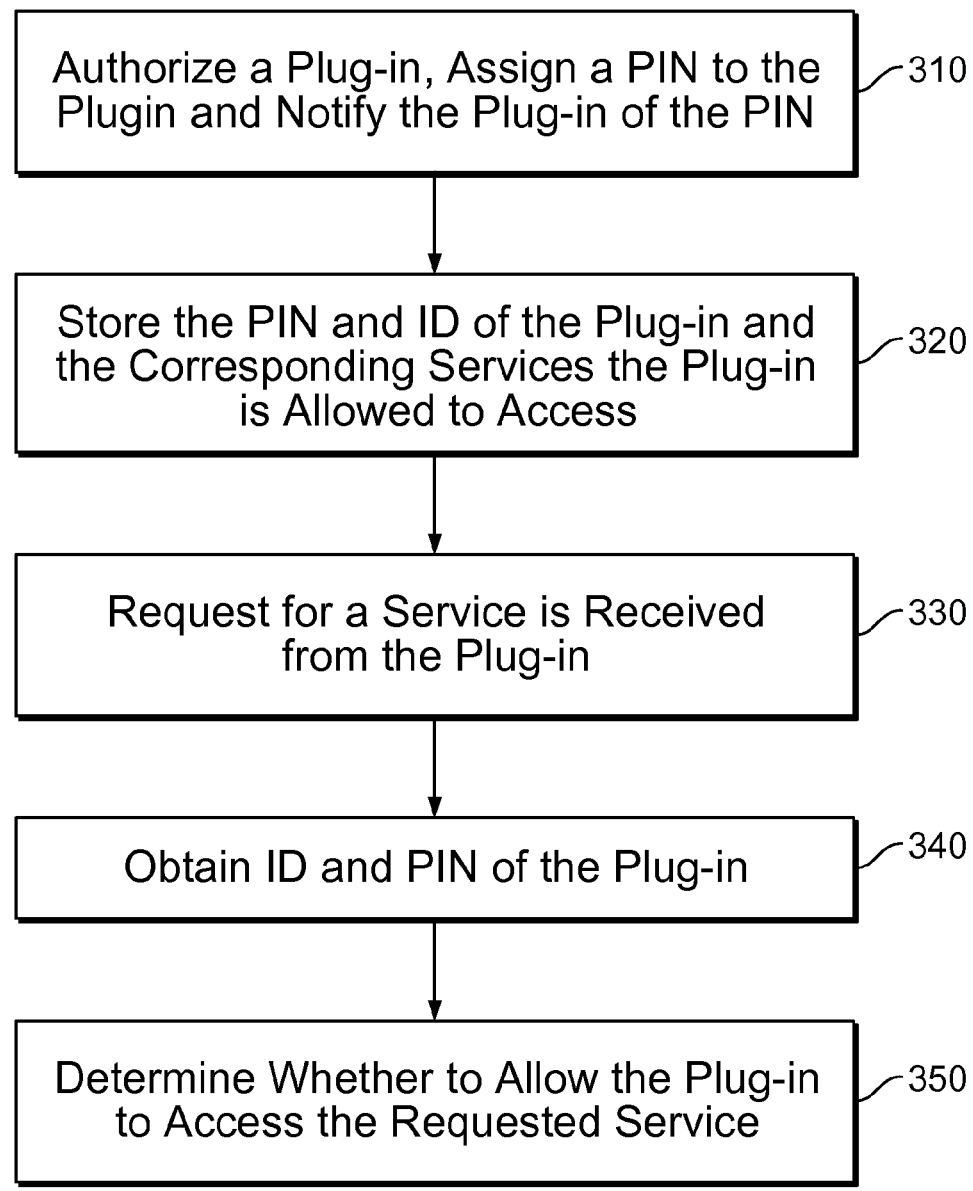
FIG. 3 is a flow chart illustrating an embodiment of a plug-in privilege control method.

FIG. 3 is a flow chart illustrating an embodiment of a plug-in privilege control method. The process may be performed on a system such as the one illustrated in FIG. 2.

At 310, a plug-in is authorized to access certain services and is assigned a Plugin Identification Number (PIN), which may be an alphanumerical string. The PIN is used to identify the corresponding plug-in, specifically an identifier (ID) such as a human readable name of the plug-in. The plug-in is notified about the PIN subsequently. A PIN can be generated randomly or according to certain assignment scheme. Both the PIN and the plug-in ID are stored, for example in a plug-in server. If a plug-in is used, the plug-in ID is retrieved along with the corresponding PIN. In some embodiments, the byte address of the plug-in ID's storage space can be assigned as the PIN that corresponds to the plug-in.

At 320, information about the PIN and ID of the plug-in and the services the plug-in is allowed to access are stored. In some embodiments, the plug-in server stores a set of services provided by the host application program. A table or other appropriate data structure is used to store a mapping of the plug-in information and the respective services the plug-ins are allowed to access. Thus, the plug-in server stores both the information of the plug-in and the information of the services that the plug-in can access, as well as the accessibility correspondence relationships between the plug-ins and the lists of services. In some embodiments, the information is stored in the form of a table in the server.

310 and 320 may be repeated for multiple plug-ins to store information about the plug-ins and their allowed services on the server for later use.

In some embodiments, limited accessibility for the plug-in can be further set and stored on the plug-in server. For example, limitations may be set for access frequencies, total number of plug-ins allowed to access certain services in a given time, etc. In some embodiments, a sensitive service is monitored and the usage of the sensitive information is recorded.

At 330, a request for a service is received from a plug-in. When a plug-in requests a service, the request includes the PIN for identifying the plug-in as well as information about the service to be accessed, such as the service name.

At 340, the ID and the PIN of the plug-in are obtained. Upon receiving the request, the server processes the request to determine the ID and the PIN. In some embodiments, the ID and the PIN are included in the request at predetermined locations and are extracted according to the request format. In some embodiments, the PIN is stored in the request and the ID is derived based on the PIN. For example, if a request includes a PIN that corresponds to the address of the storage location of the plug-in ID, the server can extract the PIN from the request and obtain the ID from the storage location at the address that corresponds to the PIN.

At 350, the server determines whether to allow the plug-in to access the requested service. In some embodiments, the mapping of plug-in information and allowed service is looked up in the previously stored data. If the ID of the plug-in is mapped to the requested service, the plug-in is authorized. In some embodiments, the byte address of the plug-in's storage space is used as the PIN, and the server can retrieve the plug-in's ID by accessing the storage location to which the byte address points.

The list of services accessible to the plug-ins is updated when a service is removed, modified, or added.

Figure 4:
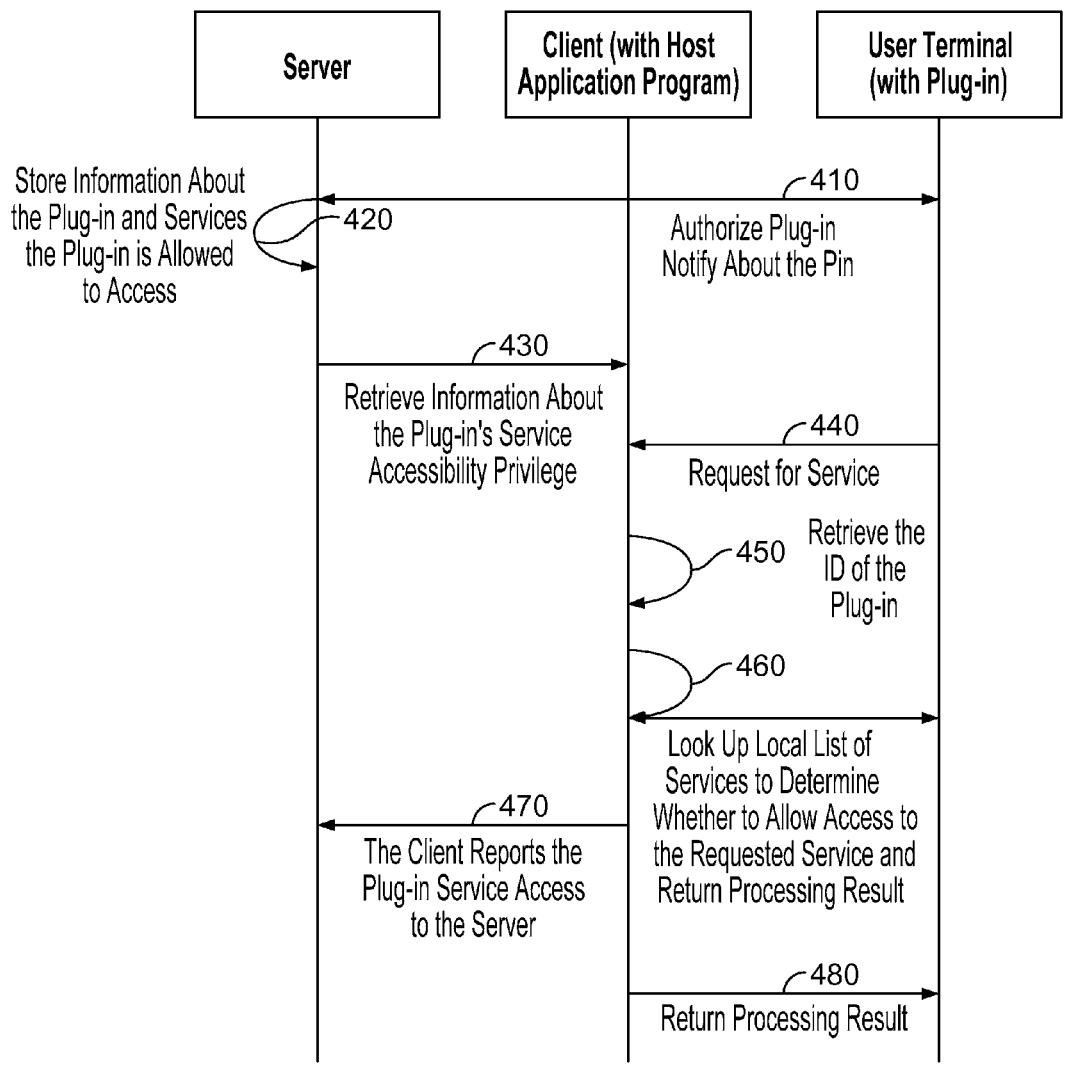
FIG. 4 is a flow diagram illustrating another embodiment of a plug-in privilege control method.

FIG. 4 is a flow diagram illustrating another embodiment of a plug-in privilege control method. The communication between the server, the client on which the host application program, and the user terminal on which the plug-in is installed is depicted.

At 410, a plug-in is authorized. In this example, the client, where the host application program resides, randomly assigns a PIN to the plug-in. The PIN is used to identify the ID of the plug-in. The client then notifies the plug-in about the PIN. The client further reports the authorization information to the server.

At 420, information about the PIN and ID of the plug-in and the services the plug-in is allowed to access is sent from the client to the server and is stored on the server. The correspondence relationships between the plug-in IDs and their accessible services are added to a mapping table that can be used for lookups.

When a request to the server to modify the services that are accessible to a plug-in, the corresponding services accessible to the plug-in can be modified upon approval of the administrator who is in charge of the host application program. When a service available from the hosting program is removed, modified, or added, the table of services accessible to the plug-in can be updated in synchronization with the information on the client.

410 and 420 can be repeated for multiple plug-ins.

At 430, the client, where the host application program resides, retrieves information about the plug-in's service accessibility privilege from the server.

In some embodiments, after a host application program is downloaded to the client, privilege control information carried in the software is installed together with the software. The privilege control information includes, but is not limited to, a list of services accessible to the plug-in, ID information of the plug-in, sensitive service information, and conditional accessibility information. Whenever the host application program is started, such information is downloaded to the client. Furthermore, the client periodically downloads the latest privilege control information from the server to ensure the synchronization of the client's local privilege control information with the information on the server.

At 440, the plug-in requests a service. The request includes the PIN for the plug-in. When a user terminal where the plug-in resides requests a service, the request includes the PIN to indentify the plug-in and indicate that the plugin is authorized. Here, the terminal may be a browser program or the like and can be on the same device as the client where the host application program also resides or on a different device.

At 450, after receiving the service request, the client retrieves the plug-in's ID according to the PIN information included in the request.

At 460, the local list of services operating on the client is queried to determine whether to allow the plug-in to access its requested service.

In some embodiments, upon receiving a service request from a plug-in, the client compares the previously received information about the accessible services to the plug-in with the local services to determine whether the requested service is among the local services accessible to the plug-in. And if not, the result of disabling service access for the plug-in is returned to the user terminal where the plug-in resides.

In some embodiments, additional accessibility information for the plug-in can be downloaded from the server. For example, accessibility may be limited based on parameters such as access frequencies, total number of plug-ins that access certain services in a given time, etc. The client determines whether the plug-in satisfies the limited accessibility requirements. If not, the result of disabling service access for the plug-in is returned to the terminal where the plug-in resides; otherwise, the result of allowing the plug-in's service access is returned to the user terminal.

At 470, the client where the host application program resides notifies the server about the plug-in's service access.

In some embodiments, the server optionally performs periodic checks about the number and frequency of a plug-in's access to sensitive services. For example, if an unauthorized plug-in tries to access a service, then an alarm is issued and a subsequent process is performed to disable the plug-in. If a pre-set threshold of a maximum number or frequency of sensitive service accesses is reached, then the server issues an alarm and performs a subsequent process to remove the service from a list of services accessible to the plug-in.

A plug-in developer can request approval for a list of accessible services for a plug-in to be deployed in a host application such as an instant communication application from the developer of the host application. Once the approval is received, the mapping table on the server is updated. If the plug-in developer does not apply for any specific services, then the server will generate a default list of services accessible to the plug-in.

At 480, the processing result is returned to the plug-in, indicating whether the plug-in is allowed to access the requested services.

Corresponding to the embodiments of the plug-in privilege control methods above, the application further provides embodiments of plug-in privilege control systems. Example implementations of embodiments of a system of plug-in privilege control are described below. The systems are described to include a number of units. The units can be implemented as software components executing on one or more processors, or as hardware such as programmable logic devices and/or Application Specific Integrated Circuits designed to perform certain functions or combinations thereof. In some embodiments, the units/subunits can be embodied by a form of software products which can be stored in a nonvolatile storage medium, such as optical disk, flash storage device, mobile hard disk, etc., including a number of instructions for making a computer device (such as personal computers, servers, network equipment, etc.) implement the methods described in the embodiments of the present invention. The units may be implemented on a single device or distributed across multiple devices. The functions of the modules or units may be merged into one another or further split into multiple sub-units.

Figure 5:
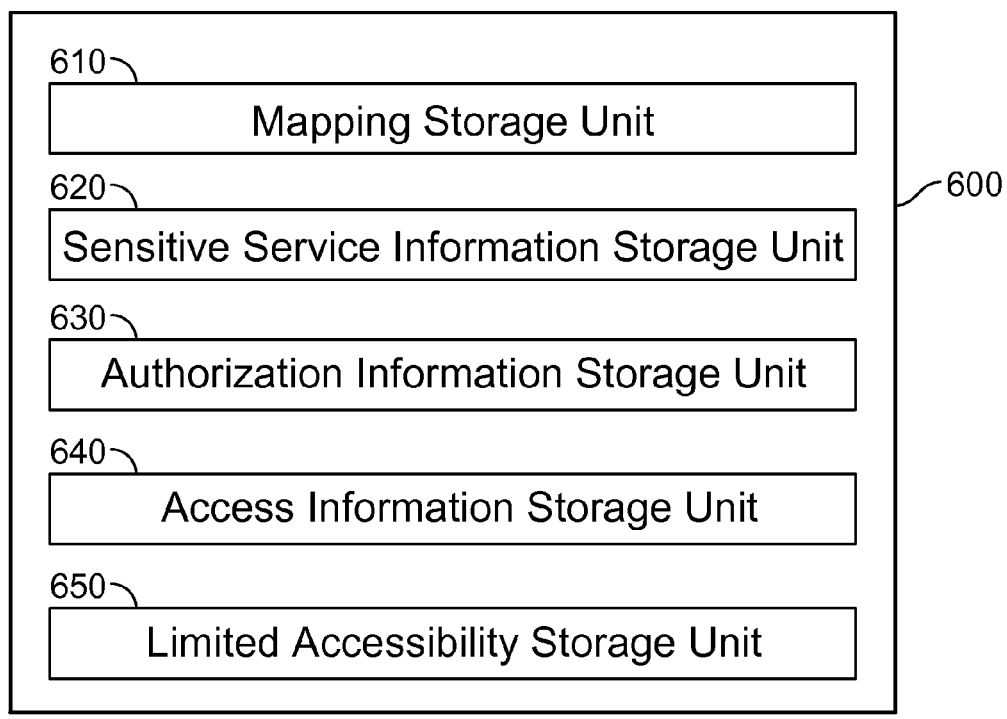
FIG. 5 is a block diagram illustrating an embodiment of a memory component of the system configured to carry out plug-in privilege control.

FIG. 5 is a block diagram illustrating an embodiment of a memory component of the system configured to carry out plug-in privilege control.

In the example shown, server 220 of FIG. 2 includes a server memory 600. The server memory 600 includes a mapping storage unit 610, which is adapted to store a correspondence relationship between a plug-in and the services accessible to it; a sensitive service information storage unit 620, which is adapted to store information about the sensitive services; an authorization information storage unit 630, which is adapted to store authorized plug-in information (for example, a table is used to store the PIN and ID of the plug-in); an access information storage unit 640, which is adapted to store the information about accessibility of the services; and a limited accessibility storage unit 650, which is adapted to store accessibility limitation parameters of the services to the plug-ins.

Figure 6:
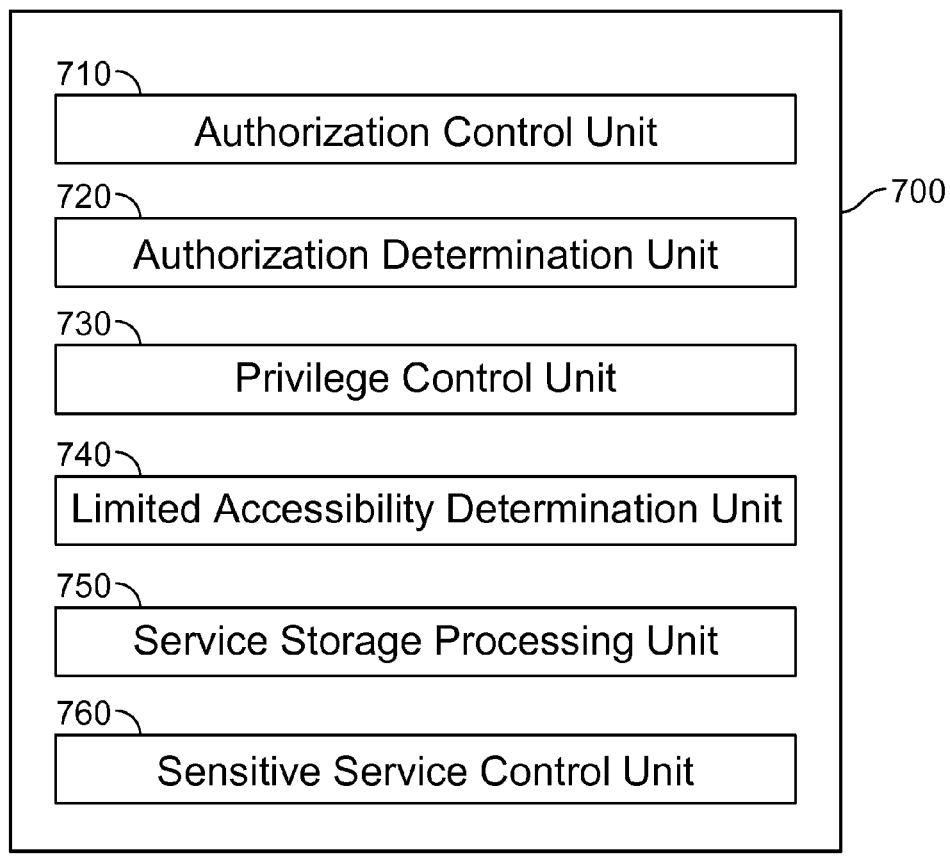
FIG. 6 is a block diagram illustrating an embodiment of a controller component of the system configured to carry out plug-in privilege control.

FIG. 6 is a block diagram illustrating an embodiment of a controller component of the system configured to carry out plug-in privilege control.

In the example shown, the server 220 of FIG. 2 further includes a server controller 700. The server controller includes an authorization control unit 710, an authorization determining unit 720, a privilege control unit 730, a limited accessibility determination unit 740, a service storage processing unit 750, and a sensitive service control unit 760.

An authorization control unit 710 is adapted to authorize a plug-in to enable the possibility to access the services it requests and to store the plug-in's privilege into a corresponding authorization information storage unit 630. In some embodiments, authorization from an authorization control unit 710 usually refers to the process of randomly assigning a plug-in a PIN that can identify the plug-in's ID, notifying the plug-in about the PIN, and storing the correspondence relationship between PIN and the plug-in in an authorization information storage unit 630. In some embodiments, the storage space can be assigned to the ID of a plug-in randomly, and the byte address of this storage space is used as the PIN of the plug-in.

An authorization determination unit 720 is adapted to query the authorization information storage unit 630 to determine whether the plug-in is authorized upon reception of a service request from a plug-in, and the service request includes the plug-in's PIN. The authorization determination unit 720 first parses the service request and then searches the authorization information storage unit 630 for the corresponding plug-in ID. If there is no corresponding ID stored in the authorization information storage unit 630, the plug-in is not authorized. If the plug-in's ID can be retrieved, the plug-in is authorized previously. In some embodiments, the byte address of the storage space is used as the PIN and the storage location of the ID is found based on the PIN.

A privilege control unit 730 is adapted to search the list-of-services storage unit 710 by a plug-in's ID to determine whether to allow a plug-in to access the service it requested.

The controller 700 can further include a limited accessibility determination unit 740, which is adapted to determine whether a requested service is one of the services accessible to the plug-in and whether the condition to access the service is satisfied; if not, the limited accessibility unit will disable the plug-in's access to the service.

The controller 700 can also further include a service storage processing unit 750, which is adapted to store the accessibility of the plug-in corresponding to the services into the access information storage unit 640.

The server controller 700 can further include a sensitive service control unit 760 which is adapted to search the access information storage unit 640 and the sensitive information storage unit 620. The sensitive service control unit disables the access by a plug-in when a condition for accessing a sensitive service is not met. For example, if a specified frequency or total number of accesses of the sensitive service is exceeded, the plug-in cannot access the sensitive service it requests.

After receiving a service request from a plug-in, server 220 queries the list of services by the plug-in's ID and determines the plug-in as an authorized plug-in if the plug-in's PIN is present in the service table. The server further searches among the accessible services corresponding to the plug-in's ID for the service that the plug-in has currently requested. If the requested service is found among the list of accessible services, then an access to the service is granted; otherwise, an access to the service is disabled. In some embodiments, if limited accessibility for the plug-in is present, then the server 220 further determines whether the plug-in satisfies a condition of limited accessibility. If the condition is not met, the service requested by the plug-in is denied. Otherwise, the plug-in is allowed to access the service it requested.

The list of services accessible by the host application program server can be modified upon approval of the person in charge of the host application program.

In the embodiments above, the centralized server 220 determines the access privileges of all the plug-ins. This centralized approach enables the server 220 to enforce centralized privilege control. However, because there are no other servers/processors to share the processing work load, processing of the plug-in service request may be delayed.

In some embodiments, the list of services is stored at client 210 on the client's end. That is, a plug-in's service access privileges are controlled primarily at the client's end instead of the server's. Even if the server's work load is heavy, it does not affect the processing efficiency of the plug-in privilege control.

Server 220 further includes a memory 810 and a controller 820.

Figure 7:
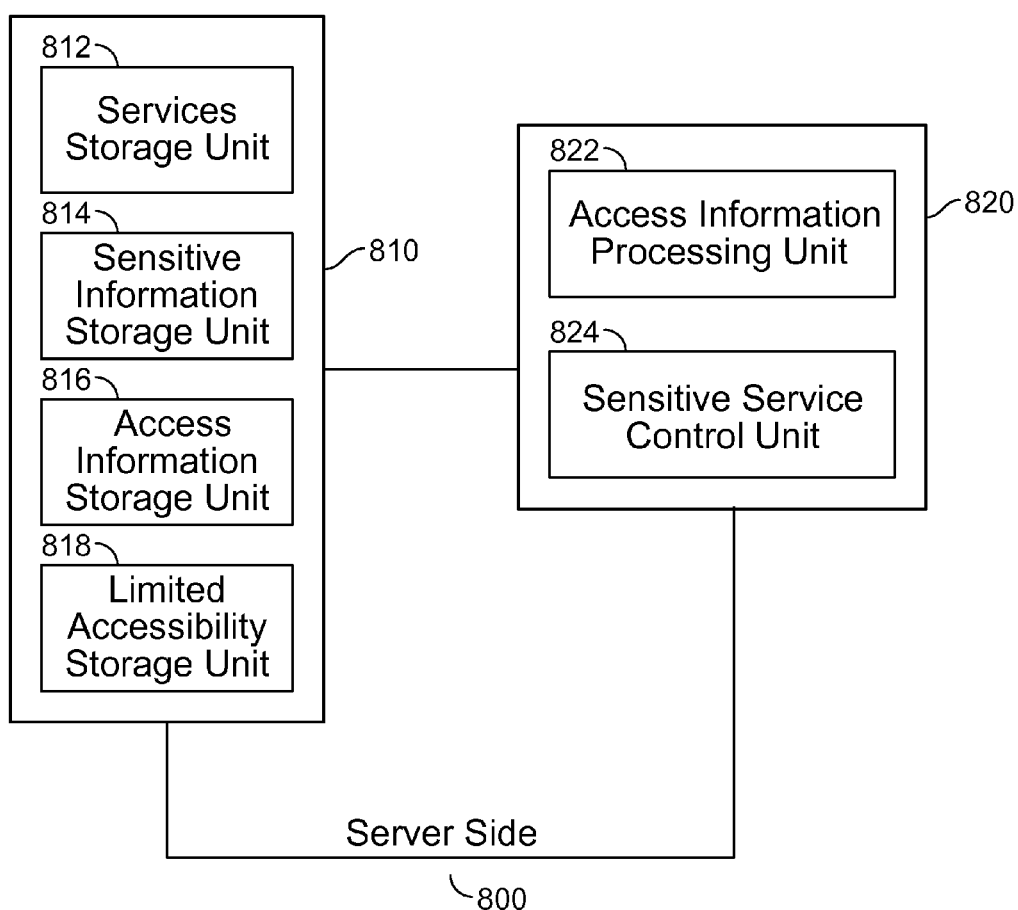
FIG. 7 is a block diagram illustrating a server-side embodiment of the system configured to carry out plug-in privilege control.

FIG. 7 is a block diagram illustrating a server-side embodiment of the system configured to carry out plug-in privilege control. The server-side embodiment includes a server memory 810 and a server controller 820.

As shown in FIG. 7, the server memory 810 includes a services storage unit 812, which is adapted to store a mapping of correspondence relationships between a plug-in and the services accessible to it; a sensitive information storage unit 814, which is adapted to store information about the sensitive services; an access information storage unit 816, which is adapted to store the information about the accessibility of the services; and a limited accessibility storage unit 818, which is adapted to store accessibility limitation parameters of the services to the plug-ins.

The server controller 820 further includes an access information processing unit 822, which is adapted to receive and store information about service usage by the plug-in and store it into the access information storage unit 816. The service usage information is transmitted from the client 900 shown in FIG. 8.

The server controller 820 further includes a sensitive service control unit 824, which is adapted to search the access information storage unit 816 and the sensitive information storage unit 814. The sensitive service control unit disables the access by a plug-in when a condition for accessing a sensitive service is not met. For example, if a specified frequency or total number of accesses of the plug-into the sensitive service is exceeded, the plug-in cannot access the sensitive service it requests.

Figure 8:
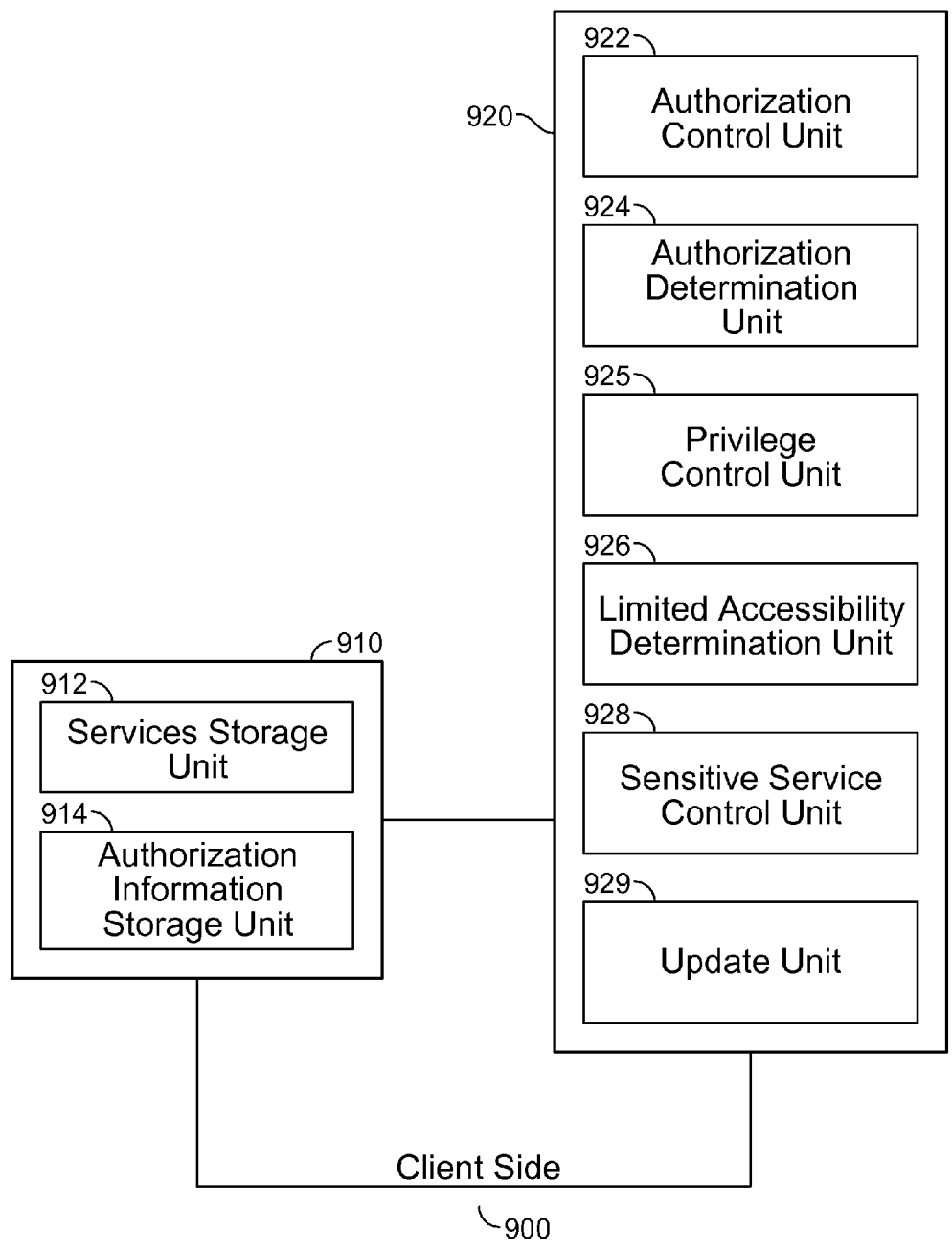
FIG. 8 is a block diagram illustrating a client-side embodiment of the system configured to carry out plug-in privilege control.

FIG. 8 is a block diagram illustrating a client-side embodiment of the system configured to carry out plug-in privilege control. The client-side memory includes a client memory 910 and a client controller 920.

As shown in FIG. 8, the server memory 910 includes a services storage unit 912, which is adapted to store a mapping of correspondence relationship between a plug-in and its accessible services, and an authorization information storage unit 914, which is adapted to store authorized plug-in information.

In some embodiments, the authorization information storage unit 914 randomly assigns a PIN to a plug-in. The PIN is used to identify the ID of the plug-in. This unit also notifies the plug-in about the PIN, and stores the PIN and the ID correspondence relationship. The PIN can be assigned using a number of methods. In some embodiments, the storage space can be assigned to the ID of a plug-in randomly, and the byte address of this storage space is used as the PIN of the plug-in.

Furthermore, the client 900, where the host program resides, can download in advance the information in the sensitive information storage unit 814 and the limited accessibility storage unit 818 of the server 800's memory 810 to the client 900. In some embodiments, the client 900 sends a synchronization request periodically to the server 800 to synchronize the information at the client's side with that at the server's side.

As shown in FIG. 8, a client controller 920 includes an authorization unit 922, an authorization determination unit 924, a privilege control unit 925, a limited accessibility determination unit 926, a sensitive service control unit 928, and an update unit 929.

An authorization control unit 922 is adapted to authorize the privilege of service access by a plug-in and store the privilege into the corresponding authorization information storage unit 914. In some embodiments, a PIN is assigned to a plug-in randomly and a correspondence relationship between the PIN and the plug-in's ID is stored into the authorization information storage unit 914. For example, the corresponding plug-in ID can be retrieved through the authorization information storage unit 914 according to the plug-in's PIN. In some embodiments, the plug-in's ID storage space is assigned randomly and the byte address of the storage space is used as the PIN.

An authorization determination unit 924 is adapted to inquire the authorization information storage unit 914 upon receiving a service request from a plug-in to determine whether the plug-in is authorized. The service request includes the plug-in's PIN. The authorization determination unit 924 first parses the service request and then searches the authorization information storage unit 914 for the corresponding plug-in ID. If there is no corresponding ID stored in the authorization information storage unit 914, the plug-in is not authorized. If the plug-in's ID can be retrieved, the plug-in was authorized previously. In some embodiments, the byte address of the storage space is taken as the PIN and the storage location of the ID is found by following the PIN.

A privilege control unit 925 is adapted to search the services storage unit 912 using the plug-in's ID to determine whether to allow a plug-in to access the service it requested.

The client controller 920 can further include a limited accessibility determination unit 926, which is adapted to determine whether a requested service is one of the services accessible to the plug-in and whether the condition to access the service is satisfied; if not, the limited accessibility unit 926 will disable the plug-in's access to the service.

The client controller 920 can further include a sensitive service control unit 928 which is adapted to search limited accessibility storage unit 818 and the sensitive information storage unit 814 on the server 800 side. The sensitive service control unit 928 disables the access by a plug-in when a condition for accessing to a sensitive service is not met. For example, if a specified frequency or total number of accesses of the plug-into the sensitive service is exceeded, the plug-in cannot access the sensitive service it requests.

The client controller 920 further includes an updating unit 929, which is adapted to update the client's local information to be synchronized with the information at the server 800 side.

One skilled in the art should understand that the embodiments of this application may be provided as a method, a system, or a computer product. Therefore, this application may be in the form of full hardware embodiments, full software embodiments, or a combination thereof. Moreover, this application may be in the form of a computer program product that is implemented on one or more computer-usable storage media (including, without limitation, magnetic disk storage, CD-ROM, flash, and optical storages) containing computer-usable program codes. Those program codes include instructions to make a computer apparatus execute full or partial embodiments of the methods described above.

The respective embodiments of the present application are described one by one, the same and similar parts of the embodiments are made by reference, and in each embodiment is emphasized the difference from other embodiments. Specifically, the system embodiments are described briefly due to similarity to the method embodiments, and relevant modules of the system embodiments are made with reference to the method embodiments.

The present application may be applied to many universal or dedicated computing system environments or configurations, for example, a personal computer, a server computer, a handset or a portable device, a flat-panel device, a multi-processor system, a microprocessor-based system, a set-top box, a programmable consumer electric device, a network PC, a minicomputer, a large-scale computer, or a distributed computing system including any one of the above systems or devices, etc.

This application is described referring to the flow chart and/or block diagram of the method, system, and computer program product according to the embodiments of this application. It should be understood that each flow and/or block in the flow chart and/or block diagram, and the combination of flows and/or blocks in the flow chart and/or block diagram may be realized in computer program instruction. In fact, the entire application may be described in the general context of a computer executable instruction that is executed by a computer, for example, a program module. Generally, the program module includes routines, programs, objects, components, data structures, etc., for executing a specified task or implementing a specified abstract data type. Alternatively, the present invention may be implemented in a distributed computing environment, where a remote processing device connected through a communication network executes the task. In the distributed computing environment, the program module may be located in a local or remote computer storage medium which includes a storage device Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A plug-in privilege control method, comprising:
   authorizing a plug-in that is a software plug-in, including assigning a plug-in identification number (PIN) to the plug-in, the PIN being used to identify the plug-in, and the plug-in being further associated with a human readable identifier (ID) that is different from the PIN;
   retrieving the ID, including:
      reading the PIN;
      retrieving the byte address where the ID is stored; and
      retrieving the ID according to the byte address;
   storing information about the plug-in and a corresponding plug-in accessible service to a mapping of plug-ins and their corresponding plug-in accessible services;
   receiving a request for a service from the plug-in;
   determining, using one or more computer processors and based on the mapping, whether to allow the plug-in to access the service requested; and
   in the event that the plug-in is allowed to access the service requested:
      determining whether the service requested satisfies a conditional accessibility requirement; and
      disabling the plug-in's access to the service requested in the event that the conditional accessibility requirement is not satisfied.

2. The method of claim 1, wherein the request for the service includes the PIN of the plug-in.

3. The method of claim 1, wherein the conditional accessibility includes a threshold of access frequency or of total number of accesses.

4. The method of claim 3, further comprising:
   removing the service from the list of services which is accessible to the plug-in in the event that an access frequency or a total number of the plug-in's service accesses exceeds the threshold; and recalculating the access frequency of or the total number of the plug-in's service accesses in the event that the threshold is not exceeded.

5. The method of claim 1, further comprising:
setting a list of sensitive services for which an alarm is generated for unauthorized plug-in access; and
monitoring plug-in accesses to the sensitive services.

6. The method of claim 1, further comprising:
detecting an unauthorized plug-in access; and
generating an alarm in response to the unauthorized plug-in access.

7. The method of claim 1, further comprising updating the mapping of services in the event that the accessible service is modified or deleted, or that a new accessible service is added.

8. A method, comprising:
authorizing a plug-in that is a software plug-in, including
assigning a plug-in identification number (PIN) to the plug-in, the PIN being used to identify the plug-in, and the plug-in being further associated with a human readable identifier (ID) that is different from the PIN;
storing information about the plug-in and a corresponding plug-in accessible service to a mapping of plug-ins and their corresponding plug-in accessible services;
receiving a request for a service from the plug-in;
determining, using one or more computer processors and based on the mapping, whether to allow the plug-in to access the service requested; and
in the event that the plug-in is allowed to access the service requested:
determining whether the service requested satisfies a conditional accessibility requirement; and
disabling the plug-in's access to the service requested in the event that the conditional accessibility requirement is not satisfied;
wherein the PIN is derived by:
randomly assigning a storage location to the ID;
storing the ID in the storage location; and
using a byte address of the storage space as the PIN.

9. A plug-in privilege control system, comprising:
one or more processors configured to:
authorize a plug-in that is a software plug-in, including to assign a plug-in identification number (PIN) to the plug-in, the PIN being used to identify the plug-in, and the plug-in being further associated with a human readable identifier (ID) that is different from the PIN;
retrieve the ID, including to:
read the PIN;
retrieve the byte address where the ID is stored; and
retrieve the ID according to the byte address;
store information about the plug-in and a corresponding plug-in accessible service to a mapping of plug-ins and their corresponding plug-in accessible services;
receive a request for a service from the plug-in;
determine, using one or more computer processors and based on the mapping,
whether to allow the plug-in to access the service requested; and
in the event that the plug-in is allowed to access the service requested:
determine whether the service requested satisfies a conditional accessibility requirement; and
disable the plug-in's access to the service requested in the event that the conditional accessibility requirement is not satisfied; and one or more memories coupled to the one or more processors, configured to provide the processors with instructions.

10. The system of claim 9, wherein the request for the service includes the PIN of the plug-in.

11. The system of claim 9, wherein the conditional accessibility includes a threshold of access frequency or of total number of accesses.

12. The system of claim 11, wherein the one or more processors are further configured to:
remove the service from the list of services which is accessible to the plug-in in the event that the access frequency or the total number of the plug-in's service accesses exceeds the threshold; and
recalculate the access frequency or the total number of the plug-in's service accesses in the event that the threshold is not exceeded.

13. The system of claim 9, wherein the one or more processors are further configured to:
set a list of sensitive services for which an alarm is generated for unauthorized plug-in access; and
monitor plug-in accesses to the sensitive services.

14. The system of claim 9, wherein the one or more processors are further configured to:
detect an unauthorized plug-in access; and
generate an alarm in response to the unauthorized plug-in access.

15. The system of claim 9, wherein the one or more processors are further configured to update the mapping of services in the event that the accessible service is modified or deleted, or that a new accessible service is added.

16. A plug-in privilege control system, comprising:
one or more processors configured to:
authorize a plug-in that is a software plug-in, including to assign a plug-in identification number (PIN) to the plug-in, the PIN being used to identify the plug-in, and the plug-in being further associated with a human readable identifier (ID) that is different from the PIN;
store information about the plug-in and a corresponding plug-in accessible service to a mapping of plug-ins and their corresponding plug-in accessible services;
receive a request for a service from the plug-in;
determine, using one or more computer processors and based on the mapping, whether to allow the plug-in to access the service requested; and
in the event that the plug-in is allowed to access the service requested:
determine whether the service requested satisfies a conditional accessibility requirement; and
disable the plug-in's access to the service requested in the event that the conditional accessibility requirement is not satisfied; wherein
the PIN is derived by:
randomly assigning a storage location to the ID;
storing the ID in the storage location; and
using a byte address of the storage space as the PIN; and
one or more memories coupled to the one or more processors, configured to provide the processors with instructions.

17. A computer program product for plug-in privilege control, the computer program product being embodied in a non-transitory computer readable storage medium and comprising computer instructions for:
authorizing a plug-in that is a software plug-in, including assigning a plug-in identification number (PIN) to the plug-in, the PIN being used to identify the plug-in, and the plug-in being further associated with a human readable identifier (ID) that is different from the PIN;
retrieving the ID, including:
  reading the PIN;
  retrieving the byte address where the ID is stored; and
  retrieving the ID according to the byte address;
storing information about the plug-in and a corresponding plug-in accessible service to a mapping of plug-ins and their corresponding plug-in accessible services;
receiving a request for a service from the plug-in;
determining, using one or more computer processors and based on the mapping, whether to allow the plug-in to access the service requested; and
in the event that the plug-in is allowed to access the service requested:
  determining whether the service requested satisfies a conditional accessibility requirement; and
  disabling the plug-in's access to the service requested in the event that the conditional accessibility requirement is not satisfied.

* * * * *

UNITED STATES PATENT AND TRADEMARK OFFICE
CERTIFICATE OF CORRECTION

| | |
|---|---|
| PATENT NO. | : 9,100,386 B2 |
| APPLICATION NO. | : 13/717270 |
| DATED | : August 4, 2015 |
| INVENTOR(S) | : Wen et al. |

It is certified that error appears in the above-identified patent and that said Letters Patent is hereby corrected as shown below:

Title page, item 56, Other Publications, after "Enhancing web browser security against", delete "nnalware" and insert --malware--, therefor.

Signed and Sealed this
Fifth Day of July, 2016

Michelle K. Lee
*Director of the United States Patent and Trademark Office*